United States Patent [19]
Okazaki et al.

[11] Patent Number: 5,765,894
[45] Date of Patent: Jun. 16, 1998

[54] SEAT DEVICE FOR A VEHICLE

[75] Inventors: Hiroyuki Okazaki, Chiryu; Naoaki Hoshihara, Chita-gun; Yoshihiro Hirate, Toyota, all of Japan

[73] Assignee: Aisin Seiki Kabushiki Kaisha, Japan

[21] Appl. No.: 904,840

[22] Filed: Aug. 1, 1997

Related U.S. Application Data

[63] Continuation of Ser. No. 520,688, Aug. 30, 1995, abandoned.

[30] Foreign Application Priority Data

Aug. 31, 1994 [JP] Japan ................................ 6-206230

[51] Int. Cl.$^6$ ........................................................ B60N 2/02
[52] U.S. Cl. ........................... 296/65.1; 297/378.13; 297/336
[58] Field of Search ........................ 296/65.1; 297/378.13, 297/341, 335, 336

[56] References Cited

U.S. PATENT DOCUMENTS

| | | | |
|---|---|---|---|
| 5,282,662 | 2/1994 | Bolsworth et al. | 296/65.1 |
| 5,330,245 | 7/1994 | Boisset | 296/65.1 |
| 5,393,116 | 2/1995 | Bolsworth et al. | 296/65.1 |

FOREIGN PATENT DOCUMENTS

5-46978   12/1993   Japan.

Primary Examiner—Joseph D. Pape
Attorney, Agent, or Firm—Finnegan, Henderson, Farabow, Garrett, and Dunner, L.L.P.

[57] ABSTRACT

A seat device for mounting on a vehicle-floor including a first engaging member fixed to a front portion of a seat and detachably engaged with a fastening portion of the vehicle-floor, a second engaging member pivoted to the first engaging member and having one end engagable with the fastening portion of the vehicle-floor and the other end being in contact with the vehicle-floor, an urging member for biasing the one end of the second engaging member toward the fastening portion of the vehicle-floor, and a fixing mechanism provided at a rear portion of the seat for engaging or disengaging the seat from the vehicle-floor.

7 Claims, 8 Drawing Sheets

Fig. 9

SEAT DEVICE FOR A VEHICLE

This application is a continuation of application Ser. No. 08/520,688, filed Aug. 30, 1995, now abandoned.

BACKGROUND OF THE INVENTION

The present invention relates to a seat device for a vehicle; and more particularly to a seat device that is rotatable to a stored position and detachable from the vehicle floor.

A conventional seat device is disclosed, for example, in Japanese Utility Model Publication No. 5-46978 published on Dec. 9, 1993 after examination. The conventional seat device includes a lower bracket fixed to a front portion of a vehicle-floor, an upper bracket fixed to a front of a seat-cushion and rotatably connected to the lower bracket by a pin, and a connecting mechanism disposed between a rear portion of the seat-cushion and the vehicle-floor for establishing a detachable engagement therebetween. When the rear portion of the seat-cushion is released from the vehicle-body upon manipulation of the connecting mechanism, the seat-cushion is able to be rotated about the pin. Thus, upon rotation of the front portion of the seat-cushion through an angle, the seat device is transferred to its stored position.

However, in the foregoing structure of the conventional seat device, the lower bracket fixed to the vehicle-floor and the upper bracket fixed to the seat-cushion are connected by the pin which acts as a rotating axis of the seat-cushion. Thus, detachability or removability of the seat device per se is not feasible.

In light of the foregoing, there is a need for a seat device which overcomes the drawbacks of the conventional seat devices.

SUMMARY OF THE INVENTION

Accordingly, the present invention is directed to a seat device for a vehicle that is detachable per se from the vehicle floor along with the front portion of the seat cushion when rotated through an angle short of the stored position, in which the rear portion of the seat cushion is at its uppermost location.

Additional features and advantages of the invention will be set forth in the description which follows, and in part will be apparent from the description, or may be learned by practice of the invention. The objectives and other advantages of the invention will be realized and attained by the device particularly pointed out in the written description and claims hereof as well as the appended drawings.

To achieve these and other advantages and in accordance with the purpose of the invention, as embodied and broadly described, the invention is a seat device having a first engaging member fixed to a front portion of a seat and detachably engagable with a fastening portion of the vehicle-floor, a second engaging member pivoted to the first engaging member and having one end engagable with the fastening portion of the vehicle-floor and the other end being in contact with the vehicle-floor, an urging member for biasing the one end of the second engaging member in the direction of the fastening portion of the vehicle-floor, and a fixing mechanism provided at a rear portion of the seat for engaging or disengaging the seat from the vehicle-floor.

In accordance with the present invention, while the front portion of the seat is in rotation after the rear portion of the seat is released from the vehicle-floor, the first engaging member fixed to the seat-cushion is removable from the fastening portion of the vehicle-floor as long as the second engaging member, which rotates together with the seat, is out of engagement with the fastening portion of the vehicle-floor.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of the specification, illustrate two embodiments of the invention, and together with the description serve to explain the principles of the invention.

DESCRIPTION OF THE PREFERRED EMBODIMENTS

The preferred embodiments of the present invention will be described hereinafter in detail with reference to the accompanying drawings.

Figure 1:
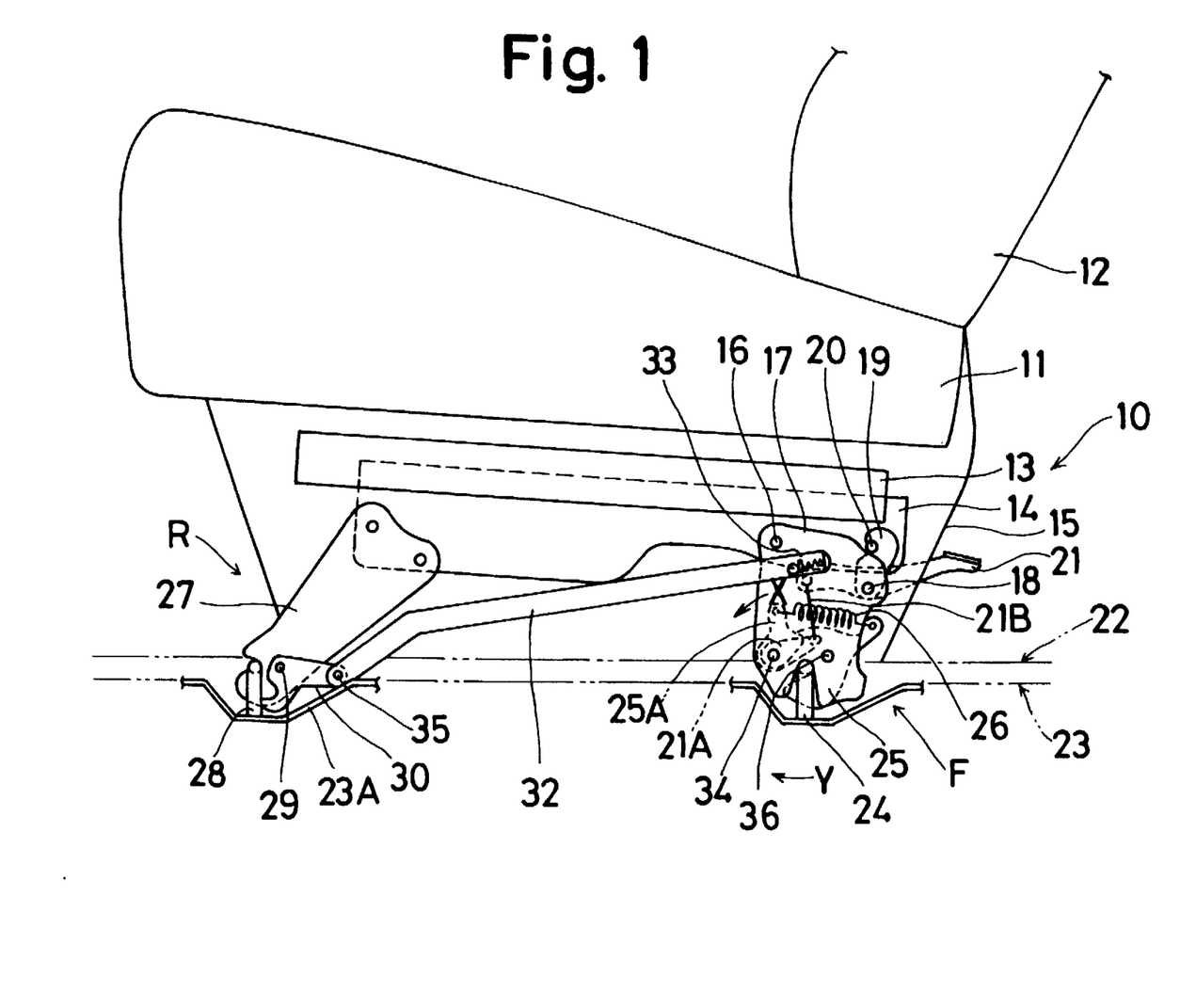
FIG. 1 is a side view of a seat device in accordance with a first embodiment of the present invention.
Figure 2:
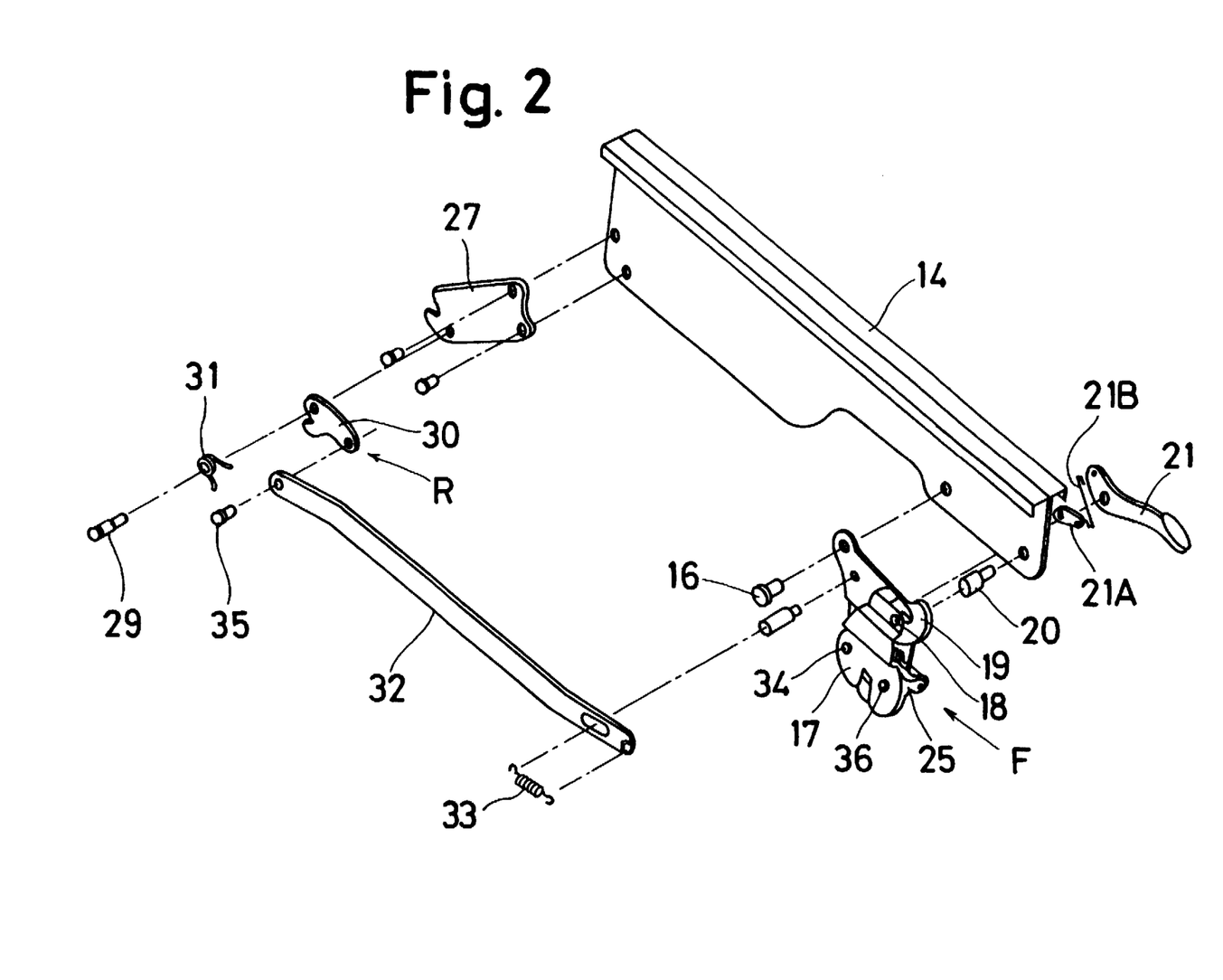
FIG. 2 is an exploded perspective view of a principal portion of the device shown FIG.1.
Figure 3:
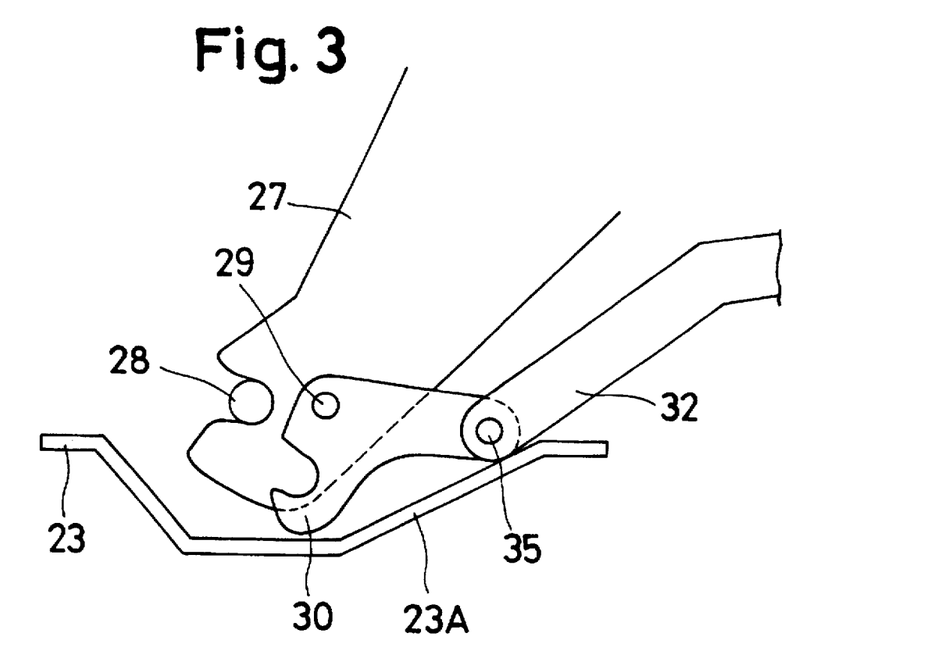
FIG. 3, FIG. 4, and FIG. 5 are fragmentary views illustrating the sequential operation of the principal portion of the device shown in FIG. 1.

Referring first to FIGS. 1 and 2, a seat device 10 according to the first embodiment of the present invention includes a seat-cushion 11, a seat-back 12 which is rotatably connected via a known reclining mechanism (not shown) to a rear end of the seat-cushion 11, a pair of equally spaced upper rails 13 (only one is shown) secured to a lower surface of the seat-cushion 11, a pair of equally spaced lower rails 14 for slidably supporting the respective upper rails 13, a fixing mechanism F disposed between a right end of each of the lower rails 14 and a vehicle floor 22, and a rotating mechanism R disposed between a left end of each the lower rails 14 and the vehicle-floor or vehicle-body 22. A cover 15 is provided to the seat-cushion 11 so as to surround or conceal the fixing mechanism F and the rotation supporting mechanism R. The vehicle floor has fastening portions 24 and 28, which according to the preferred embodiment are rigid members, similar to strike plates, in that they have an opening for removably receiving hook portions of the seat device of the present invention to detachably fix the device securely to the vehicle floor; and although the fastening members may be of any suitable cross section or configuration, they are for convenience referred to herein as strike plates or members.

As shown in FIGS. 1 and 2, the fixing mechanism F includes a bracket 17 which is pivoted to the lower rail 14 by a pin 16, a first hook 19 pivoted to the bracket 17 by a pin 18, a first strike plate or member 20 secured to the lower rail 14, a release lever 21 pivoted to a bracket 17 by the pin 18, the second strike plate or member 24 secured to a rigid portion 23 of the vehicle-floor 22, and a second hook 25 pivoted to the bracket 17 by a pin 36 so as to be in detachable engagement with the second strike member 24. The first hook 19 is in engagement with the first strike member 20 by being urged by a spring (not shown) wound around the pin 18.

The pin 34 is secured to an engaging member 25A and a spring 26 is interposed between the engaging member 25A and the second hook 25 in order to establish an engagement therebetween. The pin 34 is fixedly mounted thereon with a connecting member 21A. A rod 21B is disposed between the connecting member 21A and the release lever 21.

The rotation supporting mechanism R includes a third hook 27 secured to a left end of the lower rail 14, the third strike plate or member 28 secured to the rigid portion 23 of the vehicle-floor 22 so as to be in detachable engagement with the third hook 27, and a fourth hook 30 pivoted to the third hook 27 by a pin 29. A left end of the fourth hook 30 is engagable with the third strike plate 28. A right end of the fourth hook 30 is in engagement with slant surface portion 23A of rigid portion 23 of the vehicle-floor 22. Around the pin 29, there is wound a spring 31 which serves to urge the fourth hook 30 toward its engagement with the third strike plate 28. A left end of a link 32 is pivoted to a right end of the fourth hook 30 by a pin 35. A right end of the link 32 is connected to the bracket 17 via a spring 33.

In operation, when the release lever 21 is rotated in the counter-clockwise direction indicated by X in FIG. 1, after the folding of the seat-back 12 on the seat-cushion 11, the engaging member 25A is also brought into counter-clockwise rotation, resulting in the engaging member 25A being removed from the second hook 25. As soon as such a release is established, the urging or biasing force of the spring 26 rotates the second hook 25 in the direction of X, whereby the second hook 25 is released from the second strike member 24. Concurrently, the counter-clockwise rotation of the release lever 21 causes disengagement of the first hook 19 from the first strike plate 20.

Thereafter, if the seat-cushion 11 is raised or moved upwardly, the link 33 connected via the spring 33 to the bracket 17 brings the bracket 17 into rotation in the clockwise direction indicated by Y. As the seat-cushion 11 is raised, the link 32 causes the clockwise rotation of the bracket 17, thereby, accommodating the fixing mechanism F in the cover 15.

Figure 4:
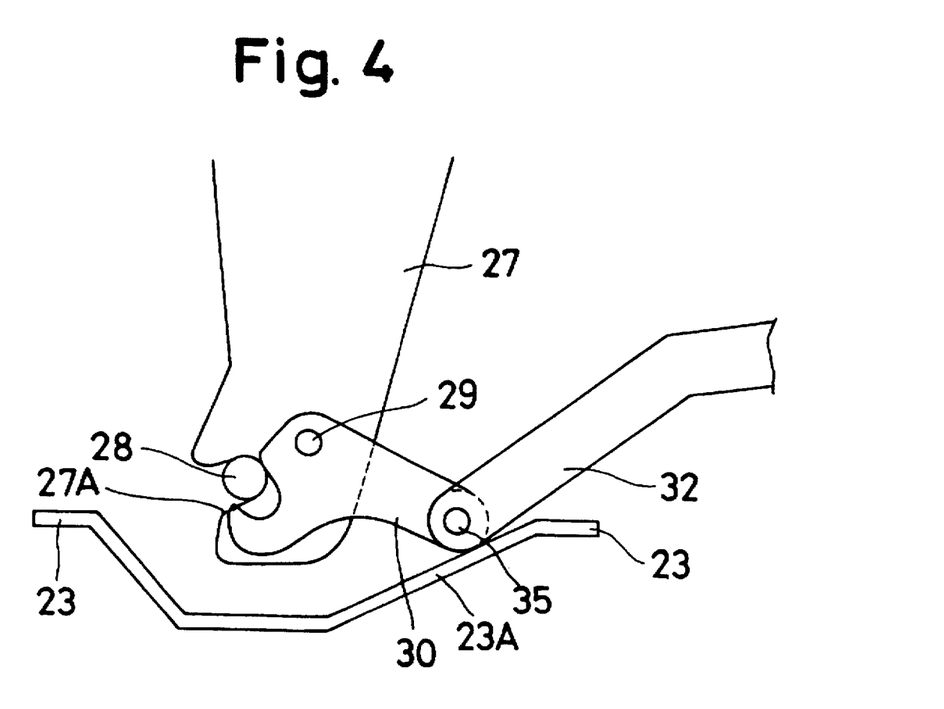
Figure 5:
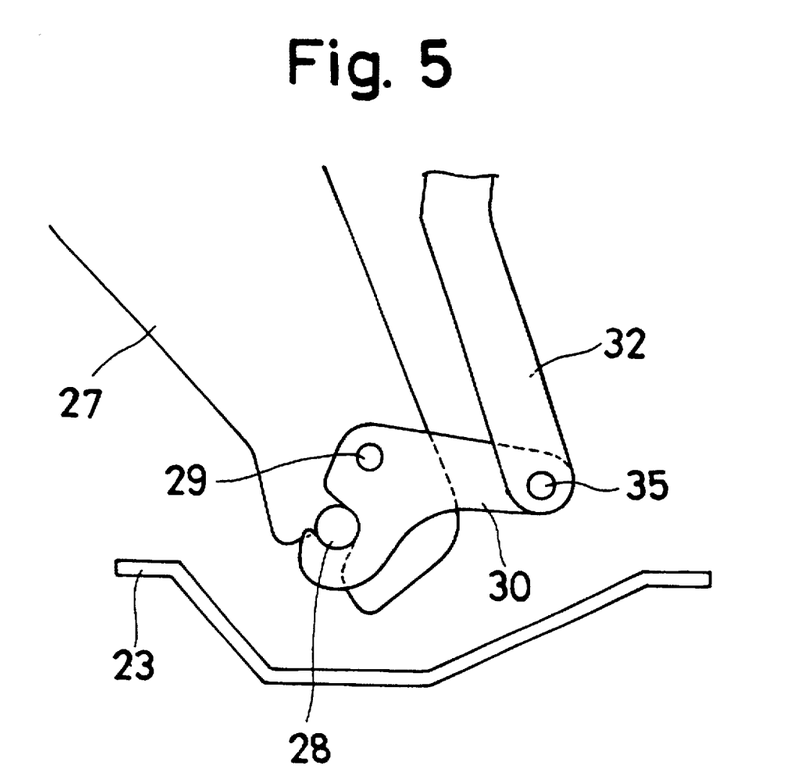
Figure 6:
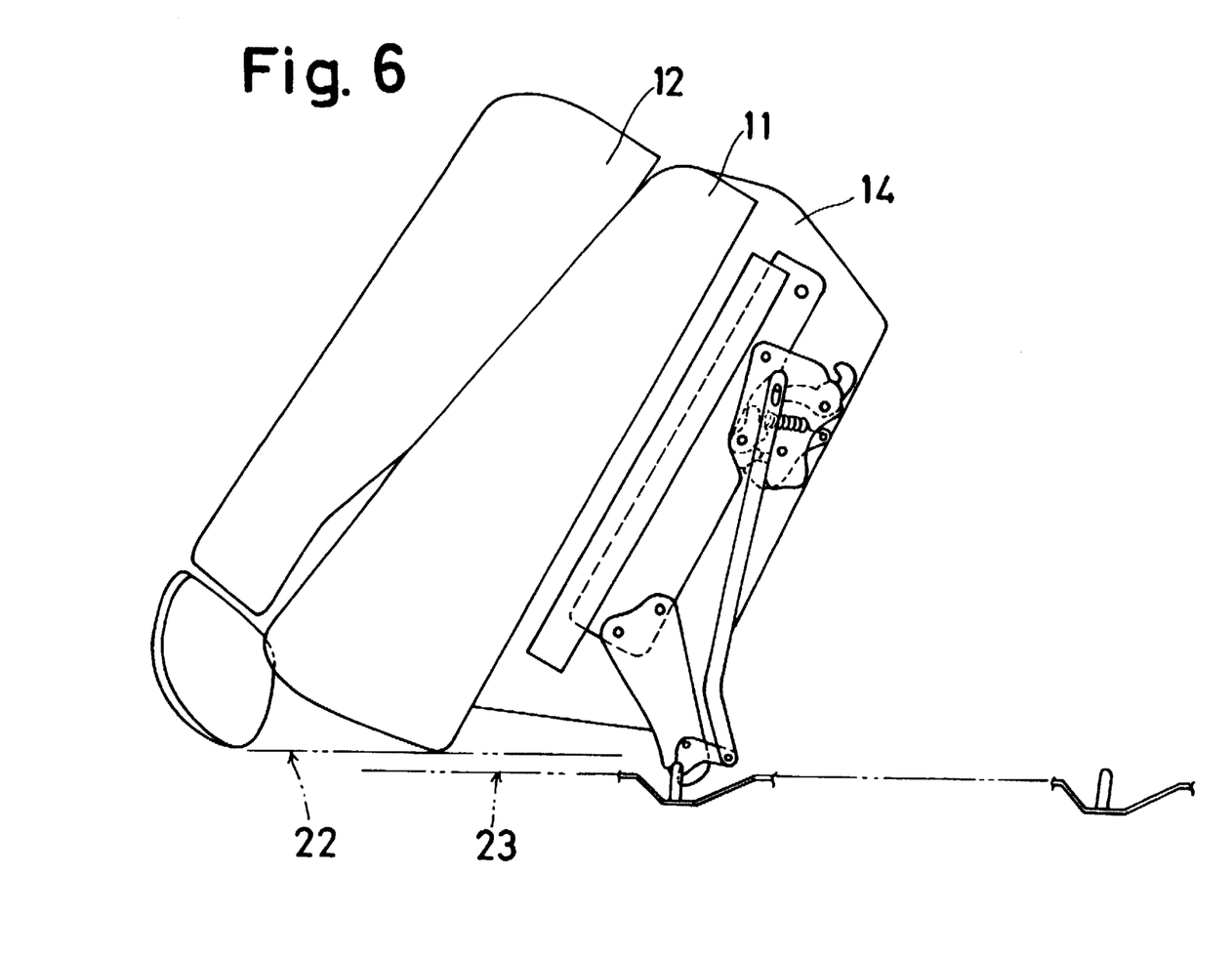
FIG. 6 is side view of the device of FIG. 1, in its stored position, in accordance with the present invention.

During such an accommodating movement of the fixing mechanism F in the cover 15, the rotation supporting mechanism R assumes the different positions shown in FIGS. 3 through FIG. 6 in that order. In detail, pursuant to the counter-clockwise rotation of the third hook 27 about the third strike member 28 which is due to the foregoing counter-clockwise rotation of the seat-cushion 11, the right end of the fourth hook 30 (FIG. 3) which is under the biasing of the spring 31 is brought into clockwise rotation about the pin 29 by being in sliding engagement with the slant surface 23a of the rigid portion 23 of the vehicle-floor 22 and takes the position as shown in FIG. 4. In light of fact that such a position of the fourth hook 30 as shown in FIG. 4 is established when the accommodation of the fixing mechanism F in the cover 15 is completed, the seat device 10 is able to be removed from the vehicle-floor 22 by raising the seat-cushion 11. As shown in FIG. 4, the raising of the seat cushion when the seat device is at a rotation angle between the stored and the use positions, because of the orientation of recess or hooking portion 27A of the hook 27 together with the rotation angle of the hook 30 governed by the slant surface 23A permits the strike plate 28 to release both the hook 27 and the hook 30. Upon further counter-clockwise rotation of the third hook 27 from the position shown in FIG. 4 to the position shown in FIG. 5, the fourth hook 30 is brought into engagement with the third strike member 28 before the seat device 10 assumes its stored position as shown in FIG. 6. Thus, under the condition shown in FIG. 5, the third hook 27 and the fourth hook 30 which are connected to the right end and the left end of the seat-cushion 11, respectively, are in engagement with the third strike member 28, thereby preventing a removal of the seat-cushion 11 from the vehicle-floor 22.

When it is desired to put the seat device 10 in a use position as shown in FIG. 1, the seat-cushion 11 is rotated in the clockwise direction, which removes the fourth hook 30 from the third strike plate 28 when the right end thereof is brought into engagement with the slant surface 23a of the rigid portion 23 of the vehicle body 22. Thereafter, due to the biasing or urging force of the spring 33 which connects the bracket 17 and the link 32, the bracket 17 is rotated toward the seat-cushion 11, and the first hook 19 and the second hook 25 are positioned in the vicinities of the first strike member 20 and the second strike member 24, respectively. Under the resultant condition, when the seat-cushion 11 is urged toward the vehicle-floor 22 the first hook 19 and the second hook 25 are brought into engagement with the first strike plate 20 and the second strike plate 24, respectively. Thus, the use position of the seat device can be attained. It is to be noted that the link 32 functions to insure the engagement of the second hook 25 with the second strike plate 24.

Figure 7:
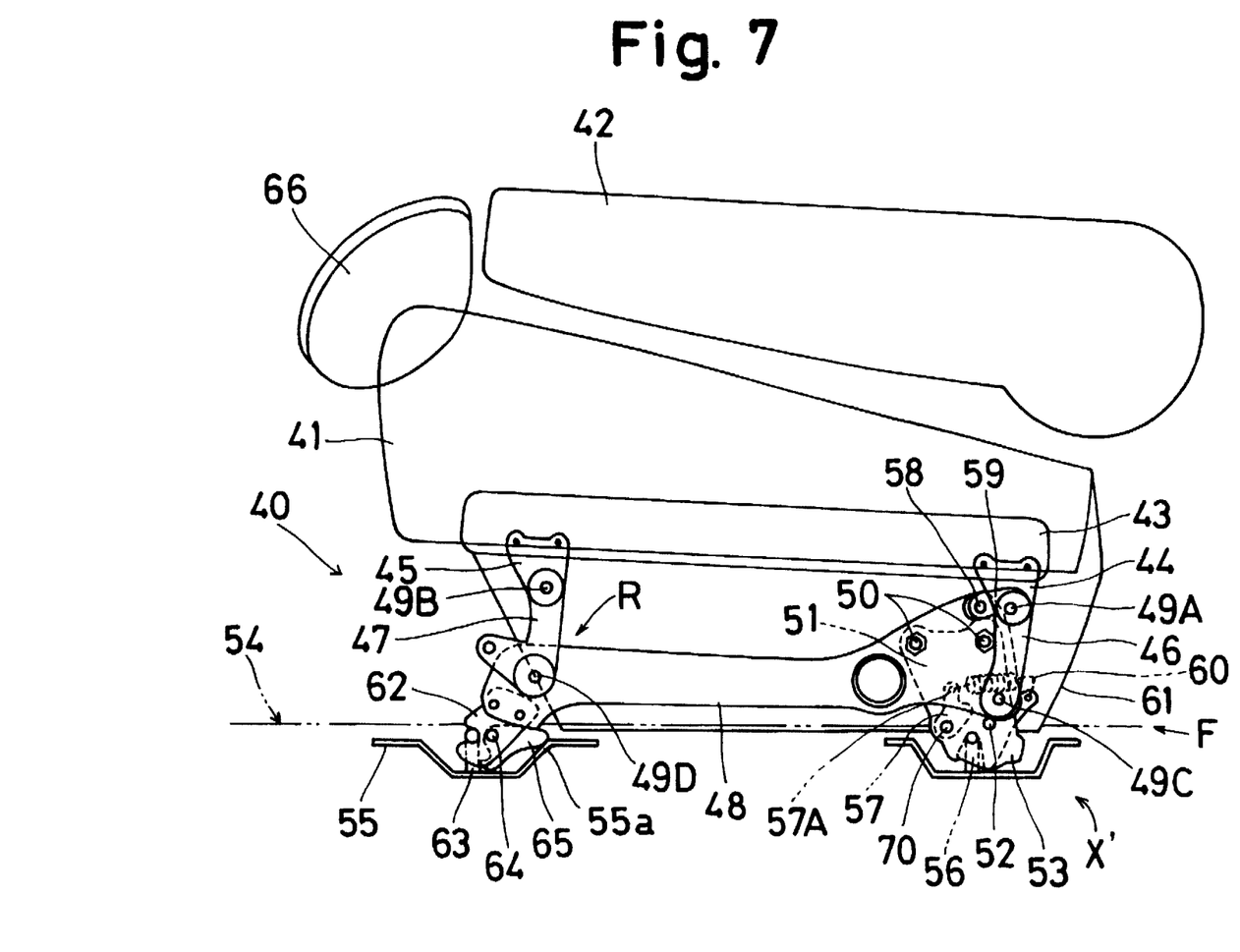
FIG. 7 is side view of a seat device in accordance with a second embodiment of the present invention.
Figure 8:
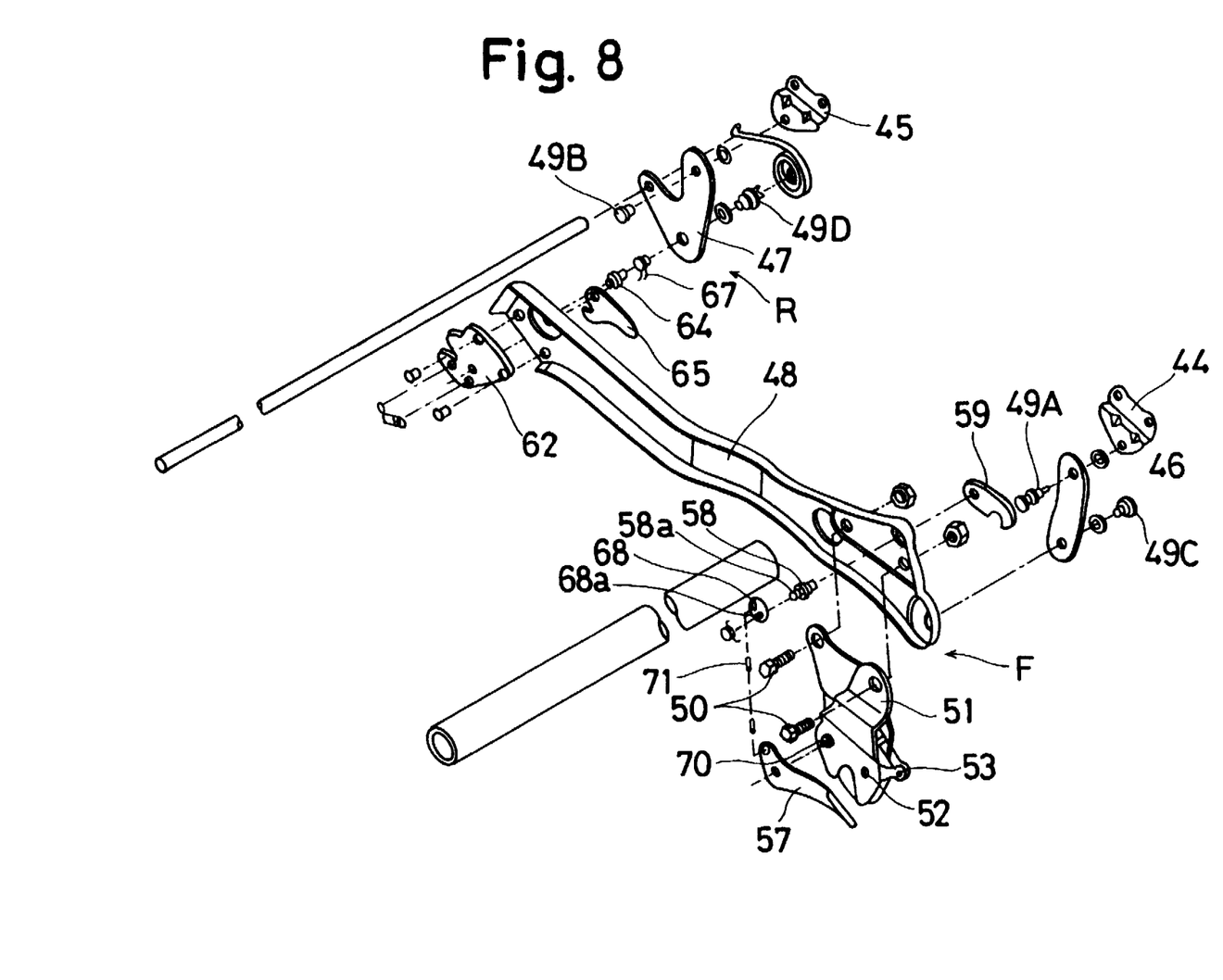
FIG. 8 is an exploded perspective view of a principal portion of the device shown in FIG. 7.
Figure 9:
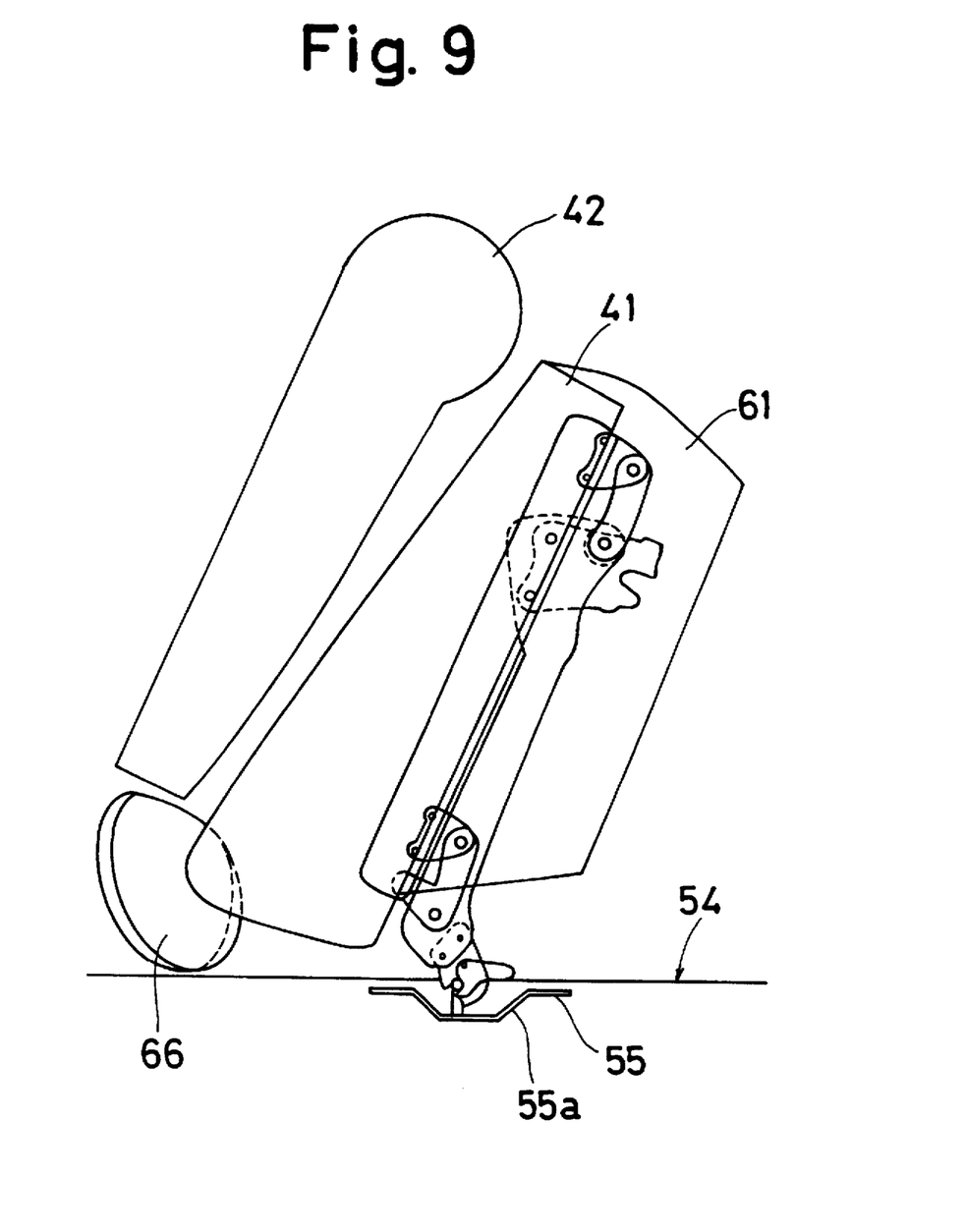
FIG. 9 is side view of the device of FIG. 7 in its stored position, in accordance with the present invention.

Referring next to FIGS. 7 to 9 inclusive, a seat-device 40 according to another embodiment of the present invention includes a seat-cushion 41, a seat-back 42 connected to a right end of the seat-cushion 41 via a known reclining mechanism (not shown), a pair of spaced seat rails 43 (only one is shown) each of which is secured to a lower portion of the seat-cushion 41, a first bracket 44 secured to a right end of the seat rail 43, a second bracket 45 secured to a left end of the seat rail 43, a first link 46 pivoted to the first bracket 44 by a pin 49A, a second link 47 pivoted to the second bracket 45 by a pin 49B, a third link 48 pivoted at right and left ends thereof to the first link 46 and the second link 47 by a pin 49C and a pin 49D, respectively, so as to be in parallel with the seat rail 43, a fixing mechanism F provided at the right end of the third link 48, and a rotation supporting mechanism R provided at the left end of the third link 48. A cover 61 is provided to the seat-cushion 41 so as to surround or conceal the fixing mechanism F and the rotation supporting mechanism R.

The fixing mechanism F includes a third bracket 51 secured to the third link 48 by a pair of pins 50, a first hook 53 pivoted to the third bracket 51 by a pin 52, a first strike plate 56 secured to a rigid portion 55 of a vehicle-floor 54 and being in detachable engagement with the first hook 53, a release lever 57 pivoted to the third bracket 51 by a pin 70, and a second hook 59 pivoted to the third link 48 by a pin 58 and engagable with the pin 49A which connects the first bracket 44 and the first link 46. On the pin 70, there is fixedly mounted an engaging member 57A. The engaging member 57A is in engagement with the first hook 53 by an actuation of the spring 60 which is disposed therebetween. The left end 58a of the pin 58 in FIG.8 is formed into a rectangular shape in cross-section and is fitted into a rectangular opening 68a of a plate 68. The plate 68 is connected to the release lever 57 by a wire 71 so that an operation of the release lever 57 is transmitted to the second hook 59. It is to be noted that the seat rail 43, the first link 46, the second link 47 and the third link 48 constitute a parallel link. Such a parallel link can decrease the distance between the third link 48 and the seat rail 43.

The rotation supporting mechanism R includes a third hook 62 secured to a left end of the third link 48, a third strike plate 63 secured to the rigid portion 55 of the vehicle-floor 54 and being in detachable engagement with the third hook 62, and a fourth hook 65 rotatably mounted on a pin 64 secured to the third hook 62. A right end and a left end of the fourth hook 65 are in engagement with a slant surface 55a of the rigid portion 55 of the vehicle-floor 54 and the third strike plate 63, respectively. A spring 67 is wound around the pin 64 so as to urge the fourth hook 65 toward the third strike plate 63.

In operation, under the condition shown in FIG. 7 wherein the seat-back 42 rests on the seat-cushion 41, if the release lever 57 is rotated in the counter-clockwise direction as indicated by X' the engaging member 57A which is to be rotated together with the pin 70 is brought into counter-clockwise rotation, resulting in the engaging member 57A being released from the first hook 53. Thus, the biasing or urging force of the spring 60 disposed between the engaging member 57A and the first hook 53 rotates the first hook 53 in the counter-clockwise direction, thereby releasing the first hook 53 from the first strike plate 56. In concurrence with the foregoing actuation of the release lever 57, the second hook 59 is rotated in the counter-clockwise direction, thereby releasing the second hook 59 from the pin 49A. As a result, when the right end of the seat-cushion 41 is raised or moved upwardly, by virtue of the function of four link mechanism, while the seat-cushion 41 is in counter clockwise rotation, the third link 48 is moved toward the seat rail 43 and the left end of the third link 48 is moved in the leftward direction. Also, during such a rotation of the seat-cushion 41 for establishing a stored position of the seat device 40 as shown in FIG. 9, the left end of the fourth hook 65 which is under the biasing of the spring 67 is rotated in the clockwise direction such that the right end of the fourth hook 65 is in sliding engagement with the slant surface 55a of the rigid portion 55 of the vehicle-floor 54. Before the seat device 40 takes the stored position shown in FIG. 9, the fourth hook 65 is brought into engagement with the third strike plate 63 and thus the seat-cushion 41 is fixedly connected to the vehicle floor 54 via a combination of the third hook 62 and the fourth hook 65 and the third strike plate 63. It is to be noted that even during movement of the seat device 10, unless the fourth hook 65 is in engagement with the third strike plate 63, the seat-cushion 41 can be removed from the third strike plate 63.

For returning the seat device 40 to its use position as shown in FIG. 7, the procedure is as follows. In detail, when the right end of the seat-cushion 41 is moved toward the vehicle floor 54, the left end of the fourth hook 65 is released from the third strike plate 63 and the right end of the fourth hook 65 is in engagement with the slant surface 55a of the rigid portion 55 of the vehicle-floor 54. Then, the first hook 53 is brought into engagement with the first strike plate 56, when the seat-cushion 41 is moved in such a manner that the third link 48 is moved away from the seat rail 43, the second hook 59 is brought into engagement with the pin 49A. Thus, the use position of the seat device 40 is established.

As apparent from the foregoing descriptions of the embodiments of the present invention, the fourth hook 30, 65 establishes an easy engagement and disengagement of the seat-cushion 11 with and from the vehicle floor 22, 54. In addition, while the seat-device 10, 40 is in the stored position, such a position can be assured by the engagement of the vehicle-floor 22, 54 with both the third hook 27, 62 and the fourth hook 30, 65.

The invention has thus been shown and described with reference to specific embodiments, however, it should be noted that the invention is in no way limited to the details of the illustrated structures but changes and modifications may be made without departing from the scope of the appended claims and their equivalents.

What is claimed is:

1. A device for mounting a vehicle seat support, having a front portion and a rear portion, to a vehicle-floor having a fastening portion comprising:

a first engaging member fixed to the front portion of the seat support for being detachably engageable with the fastening portion of the vehicle-floor upon rotation of the seat support about the fastening portion between a seating position and a storage position;

a second engaging member pivotally attached to the first engaging member and configured to have one end in engagement with the fastening portion of the vehicle floor at times when the seat support is in the storage position and out of engagement with the fastening portion of the vehicle floor when the seat support is oriented intermediate the storage and seating position;

an urging member for biasing the one end of the second engaging member in a direction to engage the fastening portion of the vehicle-floor; and a fixing mechanism provided at the rear portion of the seat support for detachably engaging the rear portion of the seat support with the vehicle-floor when in the seating position.

2. A seat device for mounting a seat support having a rear portion and a front portion to a vehicle-floor comprising:

a first bracket for fixing to the rear portion of the seat support;

a second bracket for fixing to the front portion of the seat support;

a connecting member having one end pivotally attached to the first bracket and another end pivotally attached to the second bracket forming a four-node link with the seat support, the first bracket and the second bracket;

a first engaging member fixed to the one end of the connecting member for detachably engaging the fastening portion of the vehicle-floor;

a second engaging member pivotally attached to the first engaging member and having one end engagable with the fastening portion of the vehicle-floor and another end for contact with a slanting surface of the vehicle-floor to keep the second engaging member disengaged from the fastening portion of the vehicle floor when the seat support is intermediate the stored and seating positions;

an urging member biasing the one end of the second engaging member in a direction toward the fastening portion of the vehicle-floor; and a fixing mechanism mounted at the other end of the connecting member for detachably engaging the rear portion of the seat support with the fastening portion of the vehicle-floor.

3. A device for mounting a vehicle seat support, having a front portion and a rear portion, to a vehicle-floor having a fastening portion comprising:

a first engaging member fixed to the front portion of the seat support for being detachably engageable with the fastening portion of the vehicle-floor upon rotation of the seat support about the fastening portion between a seating position and a storage position, and wherein the fastening portion of the vehicle-floor includes a strike plate which is engageable with the first engaging member;

a second engaging member pivotally attached to the first engaging member and configured to have one end in engagement with the fastening portion of the vehicle floor at times when the seat support is in the storage position, and out of engagement with the fastening portion of the vehicle floor when the seat support is oriented intermediate the storage and seating position;

an urging member for biasing the one end of the second engaging member in a direction to engage the fastening portion of the vehicle-floor; and a fixing mechanism provided at the rear portion of the seat support for detachably engaging the rear portion of the seat support with the vehicle-floor when in the seating position.

4. A device in accordance with claim 3, wherein the one end of the second engaging member has a hook configuration for receiving the strike plate of the fastening portion of the vehicle-floor.

5. A device for mounting a vehicle seat support, having a front portion and a rear portion, to a vehicle-floor having a fastening portion and a slant surface portion descending toward the fastening portion of the vehicle floor, comprising:

a first engaging member fixed to the front portion of the seat support for being detachably engageable with the fastening portion of the vehicle-floor upon rotation of the seat support about the fastening portion between a seating position and a storage position;

a second engaging member pivotally attached to the first engaging member and configured to have one end in engagement with the fastening portion of the vehicle floor at times when the seat support is in the storage position, and out of engagement with the fastening portion of the vehicle floor when the seat support is oriented intermediate the storage and seating position, said second engaging member configured to have another end slidably engageable with the slant surface to maintain the one end of the second engaging member out of engagement with the fastening portion of the vehicle floor when the seat support is oriented intermediate the storage and seating position;

an urging member for biasing the one end of the second engaging member in a direction to engage the fastening portion of the vehicle-floor; and a fixing mechanism provided at the rear portion of the seat support for detachably engaging the rear portion of the seat support with the vehicle-floor when in the seating position.

6. A device for mounting a vehicle seat support, having a front portion and a rear portion, to a vehicle-floor having a fastening portion comprising:

a first engaging member fixed to the front portion of the seat support for being detachably engageable with the fastening portion of the vehicle-floor upon rotation of the seat support about the fastening portion between a seating position and a storage position;

a second engaging member pivotally attached to the first engaging member and configured to have one end in engagement with the fastening portion of the vehicle floor at times when the seat support is in the storage position, and out of engagement with the fastening portion of the vehicle floor when the seat support is oriented intermediate the storage and seating position;

an urging member for biasing the one end of the second engaging member in a direction to engage the fastening portion of the vehicle-floor;

a fixing mechanism provided at the rear portion of the seat support for detachably engaging the rear portion of the seat support with the vehicle-floor when in the seating position; and a pair of spaced seat rails, at least one of said seat rails having a rear portion for supporting a seat, a connecting member having one end rotatably connected to the fixing mechanism, the fixing mechanism being pivotally attached at its upper end to the rear portion of the seat rail, said connecting member being brought into an approximately parallel alignment with the seat rail by being pulled during rotation of the seat support toward the stored position.

7. A device for mounting a vehicle seat support, having a front portion and a rear portion, to a vehicle-floor having a fastening portion comprising:

a first engaging member fixed to the front portion of the seat support for being detachably engageable with the fastening portion of the vehicle-floor upon rotation of the seat support about the fastening portion between a seating position and a storage position;

a second engaging member pivotally attached to the first engaging member and configured to have one end in engagement with the fastening portion of the vehicle floor at times when the seat support is in the storage position, and out of engagement with the fastening portion of the vehicle floor when the seat support is oriented intermediate the storage and seating position;

an urging member for biasing the one end of the second engaging member in a direction to engage the fastening portion of the vehicle-floor; and a fixing mechanism provided at the rear portion of the seat support for detachably engaging the rear portion of the seat support with the vehicle-floor when in the seating position, and including a bracket for mounting to the rear portion of the seat support, a hook pivotally attached to the bracket and in detachable engagement with the fastening portion of the vehicle-floor, a retainer pivotally attached to the bracket and adjacent to the hook, a spring disposed between the hook and the retainer so as to establish an engagement therebetween, and a lever for releasing the retainer from the hook.

* * * * *